US010386232B2

(12) United States Patent
Kovach et al.

(10) Patent No.: US 10,386,232 B2
(45) Date of Patent: Aug. 20, 2019

(54) COMPACT SPECTROSCOPIC OPTICAL INSTRUMENT

(71) Applicant: Horiba Instruments Incorporated, Irvine, CA (US)

(72) Inventors: Ronald Joseph Kovach, Langhorne, PA (US); Salvatore Hauptmann Atzeni, Colonia, NJ (US)

(73) Assignee: Horiba Instruments Incorporated, Irvine, CA (US)

( * ) Notice: Subject to any disclaimer, the term of this patent is extended or adjusted under 35 U.S.C. 154(b) by 30 days.

(21) Appl. No.: 15/844,228

(22) Filed: Dec. 15, 2017

(65) Prior Publication Data

US 2019/0186991 A1  Jun. 20, 2019

Related U.S. Application Data

(60) Provisional application No. 62/599,284, filed on Dec. 15, 2017.

(51) Int. Cl.
*G01J 3/28* (2006.01)
*G01J 3/02* (2006.01)
(Continued)

(52) U.S. Cl.
CPC .............. *G01J 3/0256* (2013.01); *G01J 3/021* (2013.01); *G01J 3/0202* (2013.01);
(Continued)

(58) Field of Classification Search
CPC ........ G01J 3/28; G01J 3/26; G01J 3/00; G01J 3/10; G01J 3/18; G01J 3/44; G01J 3/42;
(Continued)

(56) References Cited

U.S. PATENT DOCUMENTS 3,927,253 A   12/1975 Jungles et al.
4,618,260 A   10/1986 Okubo
(Continued)

FOREIGN PATENT DOCUMENTS

EP   0803724 A2   10/1997
EP   0933624 A1   8/1999
(Continued)

OTHER PUBLICATIONS

Perkin Elmer; Spectrum One NTS, The Ultimate Near Infrared System for QA/QC; 4 pages; 2003.
(Continued)

*Primary Examiner* — Abdullahi Nur
(74) *Attorney, Agent, or Firm* — Brooks Kushman P.C.

(57) ABSTRACT

An optical instrument for spectroscopy applications includes a compact arrangement having a three-dimensional folded optical path. A plate configured as an optical reference plane is secured to a housing and is configured to secure optical components above or below the plate. A modular light source module may be secured within the housing without fasteners. A monochromator and spectrometer are secured below the plate. Mirrors disposed above the plate are configured to direct light from the monochromator passing through a first opening in the plate through a sample disposed above the plate, and to direct light from the sample through a second opening in the plate to the spectrometer. A controller is configured for communication with the monochromator and the spectrometer. The controller may control an entrance slit actuator for the spectrometer and positioning of an aperture upstream of the spectrometer to adjust resolution and throughput.

20 Claims, 7 Drawing Sheets (51) Int. Cl.
*G01J 3/18* (2006.01)
*G01J 3/42* (2006.01)

(52) U.S. Cl.
CPC ........... *G01J 3/0229* (2013.01); *G01J 3/0237* (2013.01); *G01J 3/18* (2013.01); *G01J 3/42* (2013.01); *G01J 2003/1842* (2013.01)

(58) Field of Classification Search
CPC ... G01J 3/12; G01J 3/02; G01N 21/65; G01N 21/64
See application file for complete search history.

(56) References Cited

U.S. PATENT DOCUMENTS

| | | | |
|---|---|---|---|
| 4,691,110 A | | 9/1987 | Nebe et al. |
| 5,515,169 A | | 5/1996 | Cargill et al. |
| 5,646,411 A | | 7/1997 | Kain et al. |
| 5,734,165 A | * | 3/1998 | Unal ................. G01J 3/28 250/338.1 |
| 5,847,400 A | | 12/1998 | Kain et al. |
| 5,972,716 A | | 10/1999 | Ragusa et al. |
| 6,104,938 A | | 8/2000 | Huiku et al. |
| 6,469,311 B1 | | 10/2002 | Modlin et al. |
| 6,795,185 B2 | | 9/2004 | Yoshizawa et al. |
| 7,265,827 B2 | | 9/2007 | Slutter et al. |
| 7,499,809 B2 | | 3/2009 | Nagura et al. |
| 7,782,455 B2 | | 8/2010 | Thevenon et al. |
| 7,812,949 B2 | | 10/2010 | Delmas et al. |
| RE42,822 E | | 10/2011 | Slutter et al. |
| 8,284,397 B2 | | 10/2012 | Thevenon et al. |
| 8,901,513 B2 | | 12/2014 | Gilmore et al. |
| 2002/0109841 A1 | | 8/2002 | Gould et al. |
| 2002/0126278 A1 | | 9/2002 | Olshausen |
| 2004/0135999 A1 | | 7/2004 | Sarger et al. |
| 2006/0124875 A1 | | 6/2006 | Yonekawa et al. |
| 2008/0013086 A1 | | 1/2008 | Deck |
| 2009/0226950 A1 | | 9/2009 | Cunningham et al. |
| 2009/0289200 A1 | | 11/2009 | Ishii |
| 2011/0292376 A1 | | 12/2011 | Kukushkin et al. |
| 2012/0228519 A1 | | 9/2012 | Gilmore et al. |
| 2013/0237896 A1 | | 9/2013 | Meibaum et al. |
| 2014/0065717 A1 | | 3/2014 | Higashi et al. |
| 2014/0093948 A1 | | 4/2014 | Durrer et al. |
| 2015/0083903 A1 | | 3/2015 | Gilmore et al. |
| 2015/0106057 A1 | | 4/2015 | Sugita et al. |
| 2016/0011048 A1 | | 1/2016 | Niggl et al. |
| 2016/0265972 A1 | | 9/2016 | Simpkin et al. |
| 2016/0377533 A1 | | 12/2016 | Kusaba et al. |
| 2017/0074794 A1 | | 3/2017 | Nakagawa et al. |
| 2017/0167918 A1 | | 6/2017 | Arimoto et al. |

FOREIGN PATENT DOCUMENTS

| | | |
|---|---|---|
| JP | 11241948 A | 9/1999 |
| JP | 2001264166 A | 9/2001 |
| JP | 2002148112 A | 5/2002 |
| JP | 2002258147 A | 9/2002 |
| JP | 2002267418 A | 9/2002 |
| JP | 2005043142 A | 2/2005 |
| JP | 2006189364 A | 7/2006 |
| JP | 2006194812 A | 7/2006 |
| JP | 2007271528 A | 10/2007 |
| JP | 2010104073 A | 5/2010 |
| JP | 2010190595 A | 9/2010 |
| JP | 2011058818 A | 3/2011 |
| JP | 2015075452 A | 4/2015 |

OTHER PUBLICATIONS

Alain Thevenon; Aberrations of Holographic Gratings; pp. 308-315; Oct. 26, 1983, International Technical Conference/Europe; Geneva Switzerland.
Ryan K. Bean et al.; Performance Advantages of Concave Grating Optics in Compact Fiber Optic Spectrometers; Department of Technical Sales, StellarNet Inc., Tampa, FL; May 1, 2016; pp. 1-4.
Horiba Jobin Yvon; VS 140 Low Cost Linear Array Spectrometers; Optical Spectroscopy Division; pp. 1-2; Downloaded Nov. 30, 2017 from http://www.horiba.com/scientific/products/oem-mini-ccd-spectrometers/ccd-pda-spectrometers/.
Horiba Jobin Yvon; Compact Spectrographs—the VS family; pp. 1-5; Downloaded Nov. 30, 2017 from http://www.horiba.com/scientific/products/oem-mini-ccd-spectrometers/ccd-pda-spectrometers/.
Horiba Jobin Yvon; OEM Versatile Spectrograph; Gratings & OEM Division; pp. 1-4; Edison, New Jersey; Downloaded Nov. 30, 2017 from http://www.horiba.com/scientific/products/oem-mini-ccd-spectrometers/ccd-pda-spectrometers/.
International Search Report and Written Opinion for International Application No. PCT/US2018/065592 dated Mar. 26, 2019.
International Search Report and Written Opinion for International Application No. PCT/US2018/065232 dated Apr. 24, 2019.

* cited by examiner

COMPACT SPECTROSCOPIC OPTICAL INSTRUMENT

CROSS-REFERENCE TO RELATED APPLICATIONS

This application is related to commonly owned and co-pending U.S. patent application Ser. No. 15/844,069, filed Dec. 15, 2017, titled "System And Method For Selective Resolution For Concave Grating Spectrometer", and commonly owned U.S. Pat. No. 8,901,513, this application claims the benefit under 35 U.S.C. § 119(e) of U.S. Provisional application Ser. No. 62/599,284 the disclosures of all of the above are hereby incorporated by reference in their entirety.

TECHNICAL FIELD

The present disclosure generally relates to a compact spectrometer having a three-dimensional optical path that may be used in a variety of applications including fluorescence and absorbance measurements of a sample.

BACKGROUND

Spectroscopic analysis, including absorption spectroscopy and fluorescence spectroscopy, may be used in applications in research and industry in various fields including chemistry, food science, biology, pharmacology, materials/nanotechnology, and water quality analysis in various environmental, geology, hydrology, oceanography/limnology, and soil science applications, for example. General-purpose commercially available spectroscopy instruments may have various design compromises to accommodate both absorbance and fluorescence measurements while meeting instrument performance requirements associated with wavelength operating range, resolution, and throughput, among others. These instruments often compete in the marketplace based not only on instrument performance, but also on cost, operability, maintenance requirements (user and/or technician), flexibility or adaptability for multiple applications, as well as the physical bench space required for a precision instrument that may be used only occasionally.

SUMMARY

In one or more embodiments, an optical instrument includes a housing and a plate secured to the housing and configured to secure optical components to either a top surface or a bottom surface of the plate. The instrument further includes a light source, a monochromator secured to the bottom surface of the plate, a spectrometer secured to the bottom surface of the plate, a plurality of mirrors secured to the top surface of the plate and configured to direct light passing through a first opening in the plate from the monochromator through a sample, and to direct light from the sample through a second opening in the plate to the spectrometer, and a controller configured for communication with the monochromator and the spectrometer.

In various embodiments, the optical instrument may include a sample holder configured to hold the sample and removably secured to the top surface of the plate without fasteners. The instrument may include a first mirror secured to the bottom surface of the plate and configured to direct light from the light source to an input of the monochromator, and a second mirror secured to the bottom surface of the plate and configured to direct light from an output of the monochromator through an opening in the plate to one of the plurality of mirrors secured to the top surface. A lens may be secured to the bottom surface of the plate in an optical path between the light source and the first mirror. The housing may include an access panel with the light source comprising a module having a lamp secured to the module and connected to an electrical connector of the module, the module configured to engage a complementary electrical connector in the housing upon insertion of the module into the housing, the module configured to be removable from the optical instrument through the access panel and secured in housing by an associated latch so that it can be secured and removed without tools.

In one or more embodiments, the optical instrument may include an absorbance detector in communication with the controller and secured to the top surface of the plate, the absorbance detector positioned in an optical path of light from the monochromator that passes through the sample. The instrument may include a reference detector in communication with the controller and secured to the top surface of the plate, the reference detector positioned to receive a portion of light from the monochromator and to provide a corresponding signal to the controller. The optical instrument may also include an aperture positioning mechanism disposed above the top surface of the plate and in communication with the controller, the aperture positioning mechanism configured to selectively position an aperture into, or out of, an optical path between the sample and the spectrometer in response to a positioning signal from the controller. The optical instrument may also include a slit plate positioning mechanism in communication with the controller, the slit plate positioning mechanism having a slit plate comprising a plurality of entrance slits having different widths and a common height, the slit plate configured to be positioned in the optical path between the sample and the spectrometer, the slit plate positioning mechanism configured to position one of the plurality of entrance slits in the optical path in response to a signal from the controller.

In various embodiments, the optical instrument may include a fixed concave diffraction grating positioned to receive an input light beam after passing through the sample, and to diffract the input light beam at a wavelength-dependent angle, and a detector positioned to receive light diffracted from the fixed concave diffraction grating and configured to provide signals to the controller in response to the light received from the fixed concave diffraction grating. The optical instrument may also include a housing having a hinged sample access door selectively openable to access a sample chamber having a bottom defined by the top surface of the plate. A sample tray module may be configured for insertion into the sample chamber and to position the sample in an optical path between the monochromator and the spectrometer. The sample tray module may include a microcontroller configured to identify the sample tray module and coupled to an associated electrical connector, the associated electrical connector configured to engage a complementary electrical connector connected to the controller and disposed within the sample chamber upon insertion of the sample tray module in the sample chamber.

In one or more embodiments, an optical instrument includes a housing having a plate configured as an optical reference plane for one or more optical components of the optical instrument and configured to secure optical components above or below the plate. A light source is disposed in the housing below the plate. A monochromator disposed below the plate and secured to the plate. A spectrometer having a fixed concave grating and a focal length of less than 100 mm is disposed below the plate and secured to the plate. A plurality of mirrors is disposed above the plate, secured to the plate, and configured to direct light from the monochromator passing through a first opening in the plate through a sample disposed above the plate, and to direct light from the sample through a second opening in the plate to the spectrometer. A controller is configured for communication with the monochromator and the spectrometer.

Various embodiments may include an optical instrument having an aperture configured for selective positioning either into, or out of, an optical path between the sample and the spectrometer by an actuator in communication with the controller. The aperture may be disposed above the plate. The optical instrument may also include a sample tray module configured for insertion into a sample chamber of the housing above the plate to position the sample in an optical path between the monochromator and the spectrometer. The sample tray module may include a microcontroller configured to identify the sample tray module and coupled to an electrical connector, the electrical connector being configured to engage a complementary electrical connector in the housing within the sample chamber and connected to the controller. The instrument may also include a light source comprising a module having a lamp secured to the module and connected to an electrical connector of the module. The module may be configured to engage a complementary electrical connector in the housing upon insertion of the module into the housing. The module may be configured to be removable from the optical instrument through an access panel of the housing, and secured in the housing without fasteners by an associated latch.

In one or more embodiments, the optical instrument includes an absorbance detector disposed above the plate and secured to the plate. The absorbance detector is configured to communicate with the controller and disposed in an optical path of light from the monochromator after passing through the sample. The instrument may also include a reference detector disposed above the plate and secured to the plate. The reference detector may be configured to communicate with the controller and configured to receive a portion of light from the monochromator. The instrument may also include an actuator associated with a slit plate having a plurality of entrance slits each having a different width and a predetermined height. The actuator may be disposed below the plate and configured to communicate with the controller to position one of the plurality of entrance slits in an optical path of an input beam to the spectrometer.

Various embodiments may include an optical instrument having a plate defining an optical reference plane and having an upper surface and a lower surface. A first optical component is secured to the upper surface of the plate and a second optical component is secured to the lower surface of the plate. The second optical component is at least one of a light source, a detector, a monochromator, and a spectrometer. The optical instrument may also include at least one mirror secured to the lower surface of the plate and configured to direct light from the second optical component through a first opening in the plate, and at least one mirror secured to the upper surface of the plate and configured to direct light from the first opening in the plate to the first optical component, and to direct light from the first optical component through a second opening in the plate.

One or more embodiments according to the present disclosure may provide associated advantages. For example, the three-dimensional folded optical design for a spectroscopic optical instrument according to the present disclosure provides a compact precision instrument for fluorescence and absorbance measurements that makes efficient use of benchtop space at a competitive cost. Use of a modular light source module according to one or more embodiments provides a pre-installed and pre-aligned light source that may be user-installed in the instrument without tools, eliminating a technician service call for replacement and alignment. A modular sample tray according to one or more embodiments provides an integrated microcontroller for self-identification, power for motor controlled sample holders or devices, and signal transmission of digital or analog signals from integrated meters, such as temperature probes and pH meters, for example. The housing and intermediate plate of one or more embodiments incorporate a highly integrated molded design with molded optical control points to facilitate optical alignment with minimal adjustments during production and quality control. In addition, use of injection molded engineered polymers having an expansion coefficient matching an aluminum base plate in one or more embodiments reduces or eliminates optical distortions associated with changes in ambient temperature.

Those of ordinary skill in the art may recognize additional features and advantages of one or more embodiments based on the following detailed description considered together with the accompanying drawings.

DETAILED DESCRIPTION

Various representative embodiments of systems and methods according to the present disclosure are described in detail. However, it is to be understood that the representative embodiments are merely examples and systems and methods according to the present disclosure may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one of ordinary skill in the art to variously employ the claimed subject matter. Simplified flowcharts or block diagrams may be provided to illustrate operation of a representative embodiment of a system or method. Those of ordinary skill in the art will appreciate that the order of steps or processes may not be required for particular applications, that some steps may have been omitted for ease of illustration and description, and that steps or processes may be repeated individually and/or as a subset of the illustrated steps or processes. Likewise, all illustrated or described steps may not be needed to provide one or more of the advantages described herein.

As those of ordinary skill in the art will also understand, various features of the present disclosure as illustrated and described with reference to any one of the Figures may be combined with features illustrated in one or more other Figures to produce embodiments of the present disclosure that are not explicitly illustrated or described. The combinations of features illustrated provide representative embodiments for typical applications. However, various combinations and modifications of the features consistent with the teachings of the present disclosure may be desired for particular applications or implementations.

Figure 1:
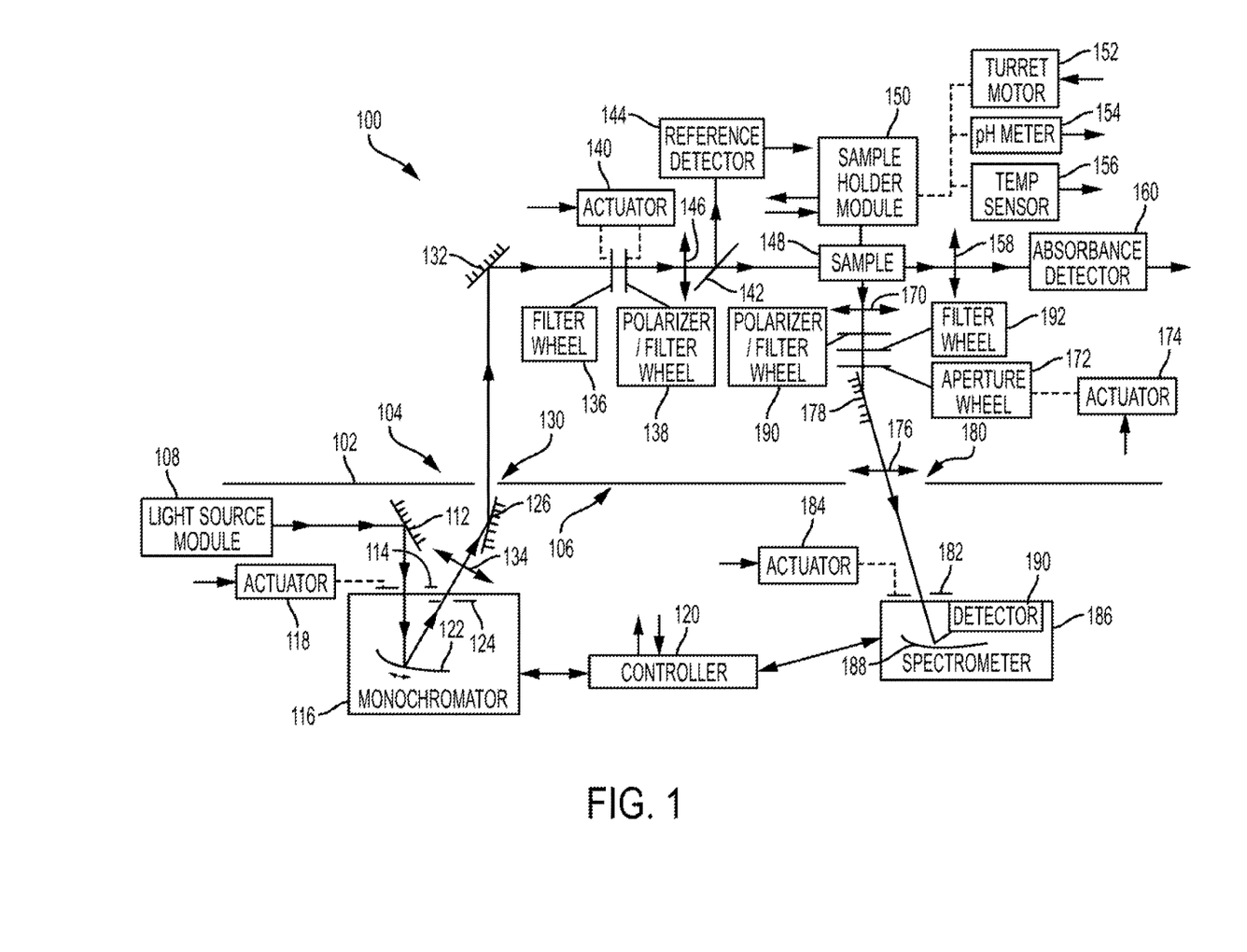
FIG. 1 is an optical block diagram illustrating a compact arrangement for an optical instrument having an optical reference plate according to representative embodiments of the present disclosure.

FIG. 1 is an optical block diagram illustrating a compact arrangement for an optical instrument 100 having an optical reference plate 102 according to representative embodiments of the present disclosure. In one or more embodiments, instrument 100 comprises a fluorescence and absorbance spectrometer with one or more optical components positioned below plate 102, and one or more optical components positioned above plate 102. Plate 102 functions as the optical reference plane for the various optical components and may be configured to secure the optical components to either an upper/top surface 104, or a lower/bottom surface 106. In the representative embodiment illustrated by the block diagram of FIG. 1, optical components illustrated below reference plate 102 may be secured directly or indirectly to a bottom surface of the reference plate. Similarly, optical components illustrated above reference plate 102 may be secured directly or indirectly to a top surface of the reference plate. Optical reference plate 102 may be secured within a housing as illustrated and described in greater detail herein.

Optical instrument 100 includes a light source module 108 having a lamp or other light source secured below plate 102 within the housing. In one or more embodiments, light module 108 is a user-serviceable module having a lamp secured to the module and connected to an electrical connector of the module as illustrated and described in greater detail with reference to FIGS. 6A, 6B, and 7. In one or more embodiments, light source module 108 includes a 75W xenon lamp.

Light from light source module 108 is reflected by an elliptical reflector and passes through the air to a mirror 112 that reflects light to an input/entrance slit wheel 114 having a corresponding entrance slit for monochromator 116. Monochromator 116 may be secured to bottom surface 106 of optical reference plate 102. Entrance slit wheel 114 may be controlled by an associated actuator 118 in communication with a controller 120. In one embodiment, actuator 118 is implemented within a positioning mechanism comprising a slit wheel having six entrance slits of different sizes. Actuator 118 rotates the slit wheel 114 to position a selected entrance slit in the optical path of light from the light source module 108 in response to an associated signal from controller 120.

Although illustrated below optical reference plate 102 in the representative embodiment of FIG. 1, controller 120 may be located above and/or below optical reference plate 102. Similarly, controller 120 may be disposed either inside or outside an associated housing and may communicate with one or more components by wired and/or wireless communication channels depending on the particular application and implementation. Although illustrated as a single device in the simplified block diagram of FIG. 1, features or functions described as associated with controller 120 may be implemented with multiple controllers that are used to control multiple components of optical instrument 100 depending on the particular application and implementation. Controller 120 generally represents a controller or computer that may include one or more microprocessors, ASICs, ICs, memory (e.g., FLASH, ROM, RAM, EPROM and/or EEPROM) and software code to perform various functions. Controller 120 may communicate directly with one or more system sensors or actuators and/or over a network using wired or wireless connections.

Controller 120 may be configured or programmed to perform one or more algorithms to perform functions as generally described herein. Control logic, functions, or algorithms performed by controller 120 will be apparent to those of ordinary skill in the art based on the detailed description of various embodiments. The illustrated and described control features and functions provide representative control strategies and/or logic that may be implemented using one or more processing strategies such as event-driven, interrupt-driven, multi-tasking, multi-threading, and the like. As such, various steps or functions may be performed as described, or in some cases omitted. Although not always explicitly illustrated, one of ordinary skill in the art will recognize that one or more steps or functions may be repeatedly performed depending upon the particular processing strategy being used. Similarly, the order of processing is not necessarily required to achieve the features and advantages described herein. The control logic may be implemented primarily in software executed by a microprocessor-based controller, such as controller 120. Of course, the control logic may be implemented in software, hardware, or a combination of software and hardware in one or more controllers depending upon the particular application as previously described. When implemented in software, the control logic may be provided in one or more non-transitory computer-readable storage devices or media having stored data representing code or instructions executed by a computer to control one or more components, process data, provide a user interface to receive user input, etc. The computer-readable storage devices or media may include one or more of a number of known physical devices which utilize electric, magnetic, and/or optical storage to keep executable instructions and associated calibration information, operating variables, measurement data, calculated results, and the like.

With continuing reference to the representative embodiment illustrated in the block diagram of FIG. 1, monochromator 116 may include a movable concave diffraction grating 122 that diffracts light at a wavelength-dependent angle to an exit slit 124. Optical system 100 is independent of the particular type of monochromator 116 or other device used to provide a monochromatic light beam. As such, monochromator 116 may include various other internal and/or associated external components including various types of diffractive, refractive, or reflective elements, such as mirrors, lenses, prism, or diffraction gratings that are ruled, blazed, holographic, etc. in concave or plano form factors, for example. Controller 120 may communicate with monochromator 116 to control selection of a desired wavelength band and intensity of light by controlling entrance slit 114 and position of grating 122.

Light exiting monochromator 116 is collected by lens 134 and then reflected by mirror 126 from below optical reference plate 102 through a first opening 130 in optical reference plate 102, to one or more components positioned above optical reference plate 102. Light passing through first opening 130 is redirected by mirror 132 and passes through a filter wheel 136 and a polarizer/filter wheel 138. Filter wheel 136 and polarizer/filter wheel 138 may have an associated positioning mechanism or actuator 140 in communication with controller 120, which controls rotation of filter wheel 136 and polarizer/filter wheel 138 to select one of a plurality of available polarizers or filters.

The light beam then passes through a lens 146 and on to a beam splitter 142 which reflects a portion of light passing through polarizer/filter wheel 138 to a reference detector 144, which is in communication with controller 120. Light that is not reflected by beam splitter 142 to reference detector 144 passes through beam splitter 142 to illuminate a sample 148 with the excitation light beam. Sample 148 may be positioned in the optical path of the excitation light beam from lens 146 by an associated sample holder module 150. Sample holder module 150 may hold one or more cuvettes configured to contain a sample for analysis. Various types of sample holder modules 150 may be removably secured to top surface 104 to hold sample 148. Sample holder module may include a turret motor 152 and one or more meters or sensors, such as represented by pH meter 154 and temperature sensor 156, for example. Sample holder module 150 may include a microcontroller or other processor to communicate with controller 120 to identify the particular type of sample holder module 150, to provide power to activate module features, such as turret motor 152, and to relay analog and/or digital signals from meters or sensors, such as pH meter 154, and temperature sensor 156, for example.

Light passing through sample 148 passes through lens 158 to an absorbance detector 160, which is in communication with controller 120. Light emitted by sample 148, such as by fluorescence, for example, passes through lens 170 and then through a polarizer/filter wheel 190 and filter wheel 192. Similar to filter wheel 136 and polarizer/filter wheel 138, polarizer filter wheel 190 and filter wheel 192 may include associated actuators (not shown) in communication with controller 120 to position a selected one of a plurality of filters and/or polarizers into the optical beam.

In one or more embodiments, an aperture wheel 172 or a similar positioning mechanism may be used to selectively position an aperture in the optical path between sample 148 upstream of spectrometer 186 as described in greater detail in commonly owned and co-pending U.S. application Ser. No. 15/844,069. As described therein, an aperture may be positioned in, or removed from, the optical path to adjust resolution of the spectrometer. Alternatively, aperture wheel 172 and associated positioning mechanism or actuator 174 may communicate with controller 120 to position a selected one of a plurality of different size apertures in the optical path. Aperture wheel 172 and associated aperture may be placed either upstream of lens 176, or downstream of lens 176. In the representative embodiment illustrated, aperture wheel 172 is positioned upstream of lens 176. Mirror 178 directs light passing through a selected aperture of aperture wheel 172 through lens 176 from above optical reference plate 102 through a second opening 180 to one or more components below optical reference plate 102, such as spectrometer 186, for example.

Light passing through second opening 180 passes through a selectable entrance slit of an associated entrance slit wheel 182 controlled by an associated positioning mechanism or actuator 184 in communication with controller 184. In one embodiment, entrance slit wheel 182 operates to position a selected one of a plurality of entrance slits in a slit plate having different widths and a common height in the optical path of the input light to spectrometer 186. Light passing through a selected entrance slit is diffracted from grating 188 at a wavelength-dependent angle to a detector 190 of spectrometer 186. Spectrometer 186 may include a fixed concave grating 188 with a charge coupled device (CCD) detector 190. In one or more embodiments, grating 188 comprises a fixed concave holographic aberration corrected grating. Spectrometer 186 may be a short focal length spectrometer having a focal length of less than 100 mm. In one embodiment, spectrometer 186 has a focal length of 70 mm. Spectrometer 186 may also have a high numerical aperture, such as greater than (or faster than) 0.25 (f/2). In one embodiment, spectrometer 186 has a numeral aperture of 0.22 (f/2.2) resulting in high light collection efficiency and excellent throughput to detector 190 positioned at the focal plane.

As illustrated in the block diagram of FIG. 1, optical instrument 100 includes one or more mirrors 132, 178 secured to top surface 104 of optical reference plate 102 and configured to direct light passing through an opening 130 in plate 102 from a light source, such as monochromator 116, through a sample 148, and to direct light from sample 148 through an opening 180 in plate 102 to a detector, such as spectrometer 186. Light may be directed by corresponding optical elements through the same opening in plate 102, or through different openings such as illustrated in the representative embodiment. Similarly, light may be directed by optical elements through open air to couple the two-dimensional optical paths above and below plate 102, or may be directed by one or more fibers, for example. However, use of fibers may increase the cost of the system and reduce optical efficiency and associated throughput. Optical instrument 100 may include one or more mirrors or other elements represented by a first mirror 112 secured to bottom surface 106 of plate 102 and configured to direct light from light source module 108 to an input of monochromator 116, and a second mirror 126 secured to the bottom surface 106 of plate 102 and configured to direct light from an output of monochromator 116 through first opening 130 to mirror 132 secured to top surface 106 of plate 102. While the representative embodiment illustrated includes one or more mirrors to direct the light beam along desired optical paths, those of ordinary skill in the art will recognize that the light beam may be directed by various other reflective, refractive, or diffractive optics depending on the particular application and implementation.

In one or more embodiments, instrument 100 includes absorbance detector 160 in communication with controller 120 and secured to top surface 104 of plate 102. Absorbance detector 160 is positioned in an optical path of light from monochromator 116 that passes through sample 148. Similarly, instrument 100 includes reference detector 144 in communication with controller 120 and secured to top surface 104 of plate 102. Reference detector 144 is positioned to receive a portion of light from monochromator 116 and to provide a corresponding signal to controller 120 during operation. Instrument 100 also includes an aperture positioning mechanism, such as aperture wheel 172 and actuator 174, disposed above plate 102 and in communication with controller 120 and configured to selectively position an aperture into, or out of, an optical path between sample 148 and spectrometer 186 in response to a positioning signal from controller 120. Instrument 100 may also include a slit plate positioning mechanism, such as slit plate wheel 182 and associated actuator 184, having a slit plate comprising a plurality of entrance slits having different widths and a common height positioned in the optical path between sample 148 and spectrometer 186, the slit plate positioning mechanism being configured to position one of the plurality of entrance slits in the optical path in response to an associated signal from controller 120. The housing and plate 102 of one or more embodiments incorporate a highly integrated molded design with molded optical control points to facilitate optical alignment with minimal adjustments during production and quality control. In addition, use of injection molded engineered polymers having an expansion coefficient matching an aluminum base plate in one or more embodiments reduces or eliminates optical distortions associated with changes in ambient temperature. Use of a single optical reference plate 102 facilitates a three-dimensional folded optical design to provide a compact precision instrument for fluorescence and absorbance measurements that makes efficient use of benchtop space at a competitive cost.

Various embodiments of instrument 100 may also include a fixed concave diffraction grating 188 positioned to receive an input light beam after passing through sample 148, and to diffract the input light beam at a wavelength-dependent angle. In addition, a detector 190 may be positioned to receive light diffracted from fixed concave diffraction grating 188 and be configured to provide signals to controller 120 in response to the light received from fixed concave diffraction grating 188. Instrument 100 may include a sample tray module or sample holder module 150 configured for insertion into a sample chamber of the housing on top of plate 102. Sample holder module 150 may be configured to position sample 148 in an optical path between monochromator 116 and spectrometer 186. Sample holder module 150 may include a microcontroller configured to identify module 150 and communicated with controller 120.

As illustrated by the block diagram of FIG. 1, various embodiments include an optical reference plate 102, which may also be referred to as an intermediate plate, that provides a common optical reference for alignment of optical components above and below the plate. This facilitates a three-dimensional optical path to provide a compact instrument while also reducing manufacturing and maintenance costs by providing minimal component adjustments and alignments during manufacturing and quality control, as well as user serviceable modules that are self-aligning relative to the reference plate. In one or more embodiments, the excitation source, fluorescence detector, and related optics are disposed below the plate, with sample handling, absorbance detector, reference detector, and related optics above the plate. Excitation components may include a light source, monochromator, filters, polarizers, and mirrors, for example. Fluorescence detection components may include polarizers, filters, various types of spectrometers or spectrographs having various configurations, gratings, and detectors including single-channel detectors (SCD) such as a photomultiplier tube (PMT), photodiode, single-photon avalanche diode (SPAD), etc., or multichannel detectors, such as a charge-coupled device (CCD), for example. This basic configuration combined with associated mechanical mounting interfaces, optical interfaces (up to four ports), and electrical/logical interfaces, may be leveraged to provide a number of embodiments for various applications that all take advantage of this compact three-dimensional optical design to limit required benchtop space while providing optical efficiency. As described in greater detail below, the electrical/logical interface facilitates power and data transfer between the instrument controller and modular sample trays that may include an associated controller supporting common transducers such as temperature sensors, pH meters, etc, In one embodiment, multiple mirrors are configured to direct an excitation light beam from below plate 102 through a first opening and illuminate a sample cuvette or microcell on one face. Light exiting from the remaining three faces of the sample cuvette or microcell, which each have different information encoded, is then directed back down through one or more openings in plate 102 to one or more detectors. For example, the cuvette face opposite the illuminated face contains transmission/absorbance information associated with the light passing generally straight through the cuvette and sample material. The two remaining faces, orthogonal to the axis of illumination, contain two fluorescence emission channels from the same sample. Each of these three beams is directed downward through one or more openings in plate 102 and passes though associated optics that may include polarizer(s) and/or filter(s) to a spectrometer and detector (single-channel or multichannel). This embodiment facilitates studies such as stopped-flow kinetics involving polarization where the two emission channels are monitored simultaneously using different polarizer angles (typically vertical and horizontal), but may also include one of the so-called "magic angle" positions.

In another embodiment, a microscope is configured to attach to a lower surface of plate 102 with one or more locating/alignment features cooperating to mechanically align the microscope relative to optical reference plate 102. Locating/alignment features may include pins, supports, etc. to provide a kinematic/reproducible alignment. One or more light beams generated by a light source positioned on a first side of (i.e. above or below) plate 102, directed to a sample on an opposite side of plate 102, and returned to the first side of plate 102 are accessible by the microscope to perform various types of analyses, such as epi-fluorescence microscopy or conventional, above-sample microscopy, for example.

In one or more embodiments, the modular sample handling features of an instrument having a compact design with a three-dimensional folded optical path may be used with a microwell plate or microtiter plate with motion control that is secured to the upper surface of the optical reference plate 102 using the modular mechanical interface to provide optical alignment. Excitation/transmission can be readily performed using microwell plates that have clear bottoms, along with fluorescence signals at the same moment, all of which can be optically directed downwards through one or more openings in plate 102 for analysis. The instrument may also accommodate a microfluidics chip or device arranged in a similar fashion to provide flowing samples that are optically interrogated with excitation followed by fluorescence, and transmission/absorbance with or without polarization as required.

In another embodiment, a modular attachment couples mechanically and optically to optical reference plate 102 in a manner that allows two or more fiber optics, or fiber optic bundles, to transfer light from an excitation port of plate 102, to an external sample or process at its distal end. One or more fiber optics or fiber optic bundles return optical signals from the external sample or process to an analysis port on plate 102. For example, to measure transmission and fluorescence at the same moment, a fiber optic bundle can be used to deliver an excitation beam to the sample or process. Two return fibers or bundles from the sample or process positioned appropriately relative to the sample (180 degrees for transmission, various other angles for fluorescence depending on the desired measurement, with 90 degrees being typical), engage corresponding optical analysis ports of plate 102 for analysis by the detector(s).

Those of ordinary skill in the art may recognize numerous other applications and implementations using a compact instrument design having an optical reference plate as illustrated by the representative embodiments described herein.

Figure 2:
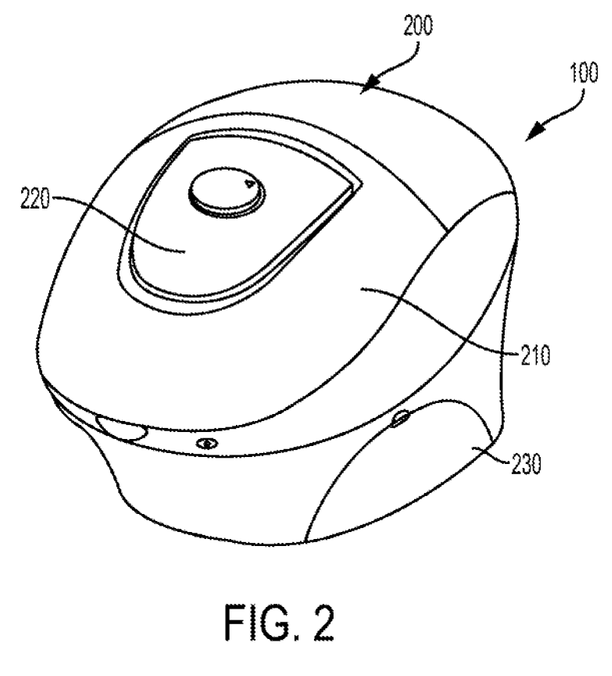
FIG. 2 is a perspective view illustrating a housing for a compact optical instrument according to representative embodiments of the present disclosure.

FIG. 2 is a perspective view illustrating a housing 200 for a compact optical instrument 100 according to representative embodiments of the present disclosure. Housing 200 may include multiple components, only some of which are illustrated in FIG. 2. In one or more embodiments, housing 200 may include a hinged cover 210 that may be selectively opened to install or remove a modular sample tray module as previously described. Hinged cover 210 may include a hinged sample door 220 that may be selectively opened to replace a sample cuvette held by the modular sample tray without removing the entire sample tray module. Housing 200 may also include an access panel 230 to provide access to a user-serviceable lamp module as previously described and illustrated in greater detail in FIGS. 6A, 6B, and 7.

Figure 3:
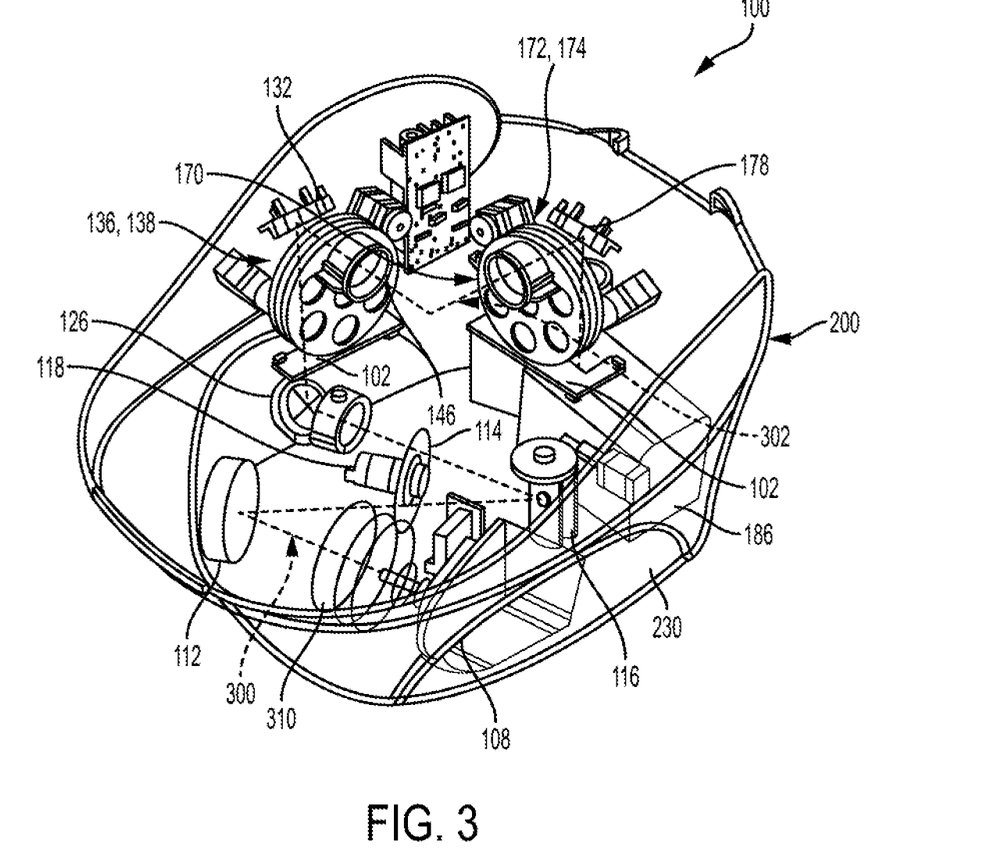
FIG. 3 is a perspective transparent view of components in a compact arrangement for an optical instrument illustrating optical paths for excitation and emission according to representative embodiments of the present disclosure.

FIG. 3 is a perspective transparent view of components in a compact arrangement for an optical instrument 100 illustrating optical paths for excitation 300 and emission 302 according to representative embodiments of the present disclosure. As illustrated and described in FIGS. 1 and 3, instrument 100 includes a folded three-dimensional optical layout that facilitates fluorescence and absorbance measurements providing two horizontal optical path planes connected by two vertical optical paths passing through first opening 130 and second opening 180 in an optical reference plate 102 to provide a compact design and reduce required bench top space. In the perspective view of FIG. 3, much of optical plate 102 has been omitted to better illustrate the three-dimensional optical paths for excitation 300 and emission 302. As shown in FIG. 3, the light source 108, excitation monochromator 116, and emission spectrometer 186 having a CCD detector are all located in the lower portion of housing 200 below optical reference plate 102. Light source module 108 may be aligned in housing 200 with a lamp extending through a reflector 310.

Excitation optical path 300 includes light from light source module 108 reflected by reflector 310 to a folding mirror 112 that reflects light through a selected entrance slit of slit wheel 114 controlled by actuator 118 of the positioning mechanism associated with monochromator 116. Light from monochromator 116 is in the same horizontal plane as the input light and is vertically redirected by folding mirror 126 up through the first opening 130 (FIG. 1) of plate 102 to another folding mirror 132. The light then travels in a second horizontal plane above plate 102 through filter wheel 136 and polarizer/filter wheel 138 to lens 146 prior to illuminating a sample (omitted for clarity). Light emitted from the sample, such as by fluorescence, travels generally perpendicularly through lens 170 and a selected aperture (which may be effectively removed by selecting a large enough aperture) of aperture wheel 172 as controlled by actuator 174. Light passing through aperture wheel 172 in the second horizontal plane above plate 102 is then redirected vertically down through second opening 180 (FIG. 1) of plate 102 to the input of spectrometer 186. In one or more embodiments, a second emission path (not shown) may be provided generally opposite emission path 302 perpendicular to the excitation path 300 in the second horizontal plane with one or more optical components provided to direct emitted light from the sample generally vertically through an opening in the plate 102 to a detector secured below plate 102.

Figure 4:
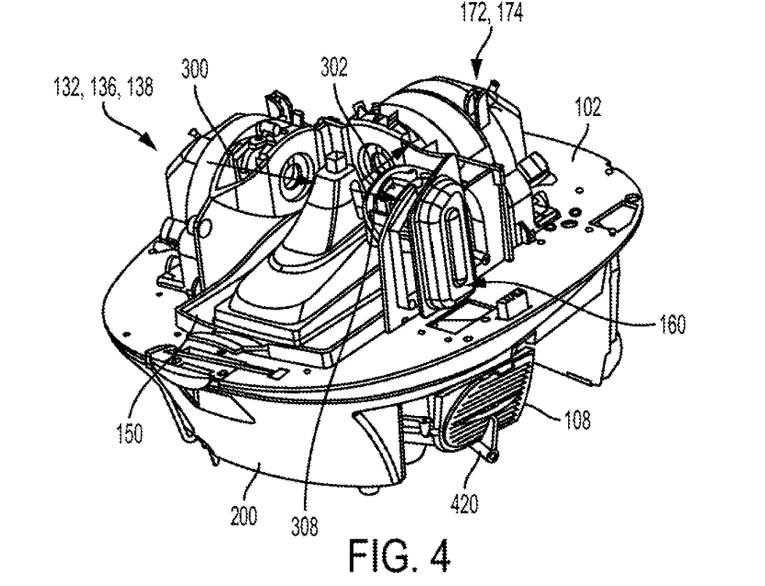
FIG. 4 is a perspective view with portions of a housing removed to illustrate arrangement of components secured above an optical reference plate in an optical instrument according to representative embodiments of the present disclosure.

The optical path for absorbance measurements has been omitted from FIG. 3 for clarity, but generally extends through the sample position in the second horizontal plan to an absorbance detector across from filter wheel 136 as generally shown in FIG. 4.

FIG. 4 is a perspective view with portions of housing 200 removed and some components omitted to illustrate arrangement of components secured above an optical reference plate 102 in an optical instrument according to representative embodiments of the present disclosure. FIG. 4 illustrates the second horizontal plane including the upper portion of excitation optical path 300 to a sample positioned by sample tray module 150, the upper portion of emission optical path 302, and absorbance optical path 308 extending to an absorbance detector 160. Lower portion of housing 200 may include a rotatable latch 420 to secure light source module 108 within housing 200. A rotatable latch 420, or similar device, provides user-serviceability to remove and install light source module 108 without tools.

Figure 5:
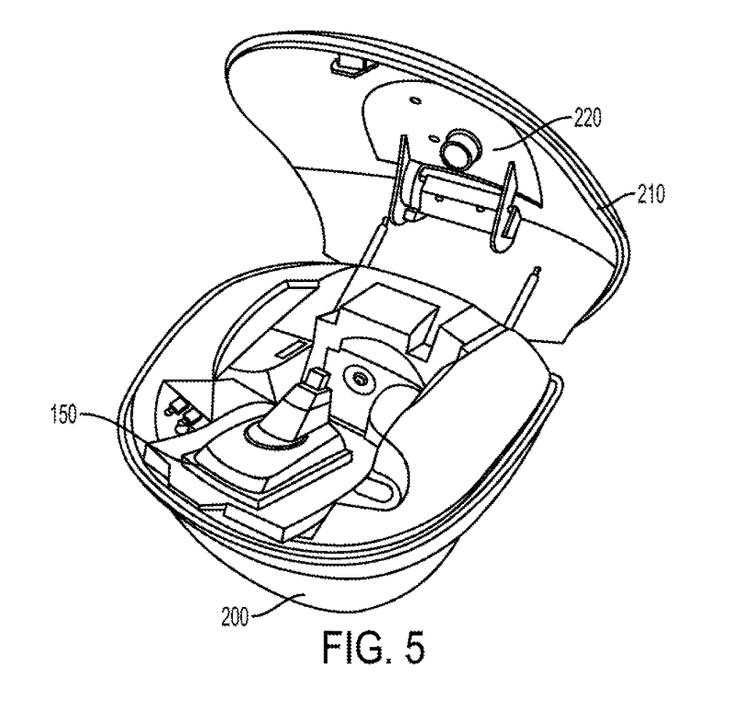
FIG. 5 is a perspective view illustrating an optical instrument with an open cover for removal of a sample holder module according to representative embodiments of the present disclosure.

FIG. 5 is a perspective view illustrating an optical instrument 100 with an open cover 210 for removal of a sample holder module 150 according to representative embodiments of the present disclosure. Sample holder module 150 is configured for insertion into a sample chamber within housing 200 above the optical reference plate to position the sample in an optical path between the monochromator and the spectrometer as previously described. Sample tray or holder module 150 may include a microcontroller configured to identify the sample tray module and coupled to an electrical connector configured to engage a complementary electrical connector in the housing within the sample chamber and connected to the controller 120 (FIG. 1).

Figure 6A:
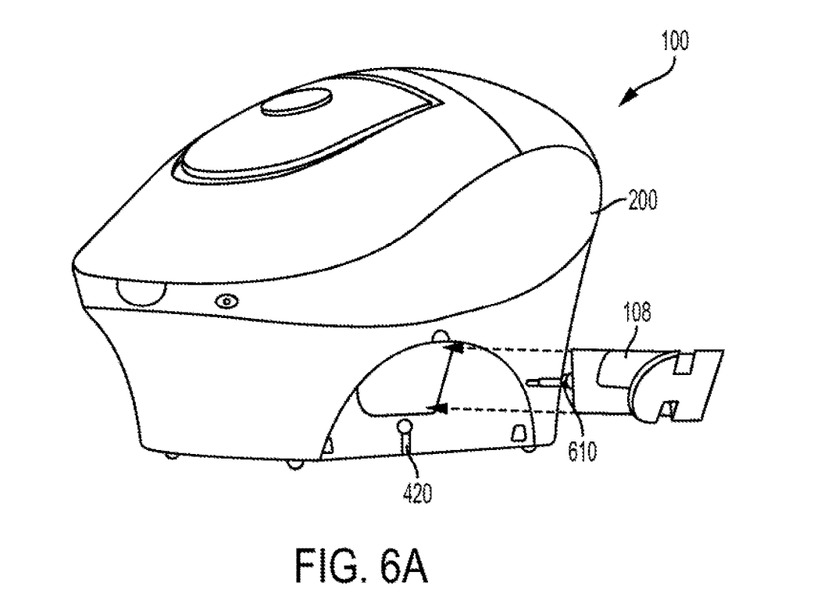
FIGS. 6A and 6B illustrate user serviceability of a modular light source in an optical instrument according to representative embodiments of the present disclosure.
Figure 6B:
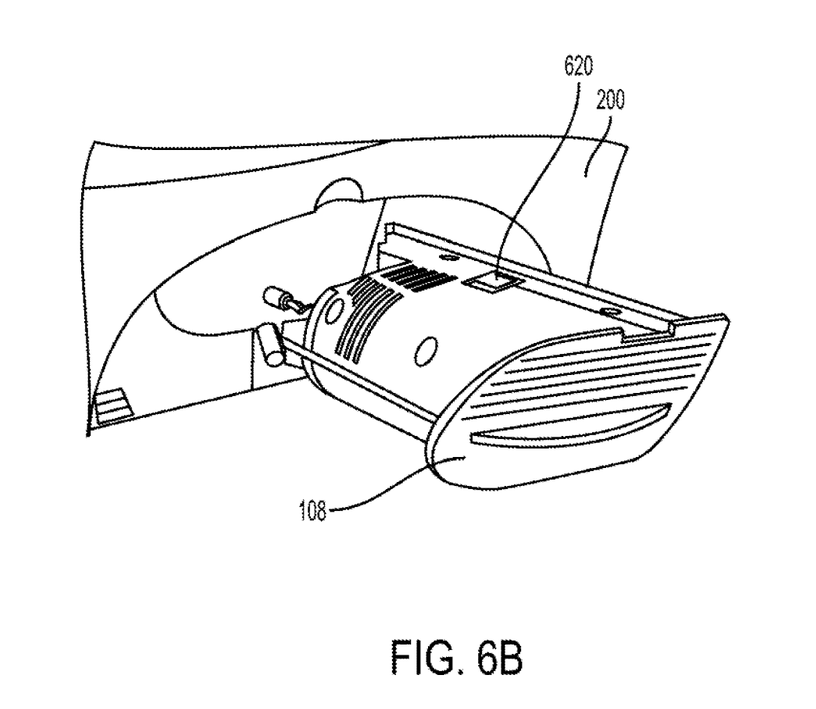
Figure 7:
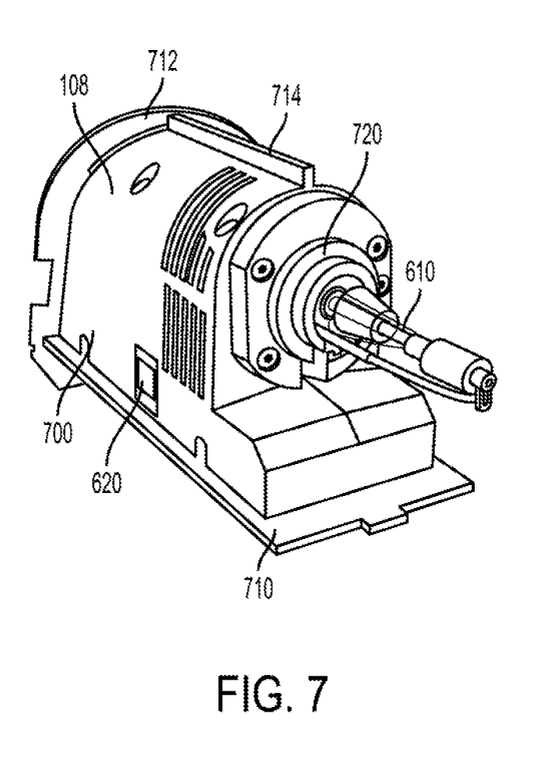
FIG. 7 is a perspective view of a modular light source for an optical instrument according to representative embodiments of the present disclosure.

FIGS. 6A and 6B illustrate user serviceability of a modular light source in an optical instrument 100 according to representative embodiments of the present disclosure. FIG. 7 is a perspective view of a modular light source for an optical instrument 100 according to representative embodiments of the present disclosure. Instrument 100 includes a housing 200 having an access panel as previously described, which has been removed to illustrate installation of light source module 108. In one or more embodiments, light source module 108 includes a lamp 610 secured to the module and connected to an electrical connector 620 of the module 108 configured to engage a complementary electrical connector in housing 200 upon insertion of module 108 into housing 200. Module 108 is configured to be removable from optical instrument 100 and selectively secured in housing 200 without fasteners by an associated latch 420, or similar mechanism.

Module 108 includes a housing 700 having a plurality of locating features for self-alignment within housing 200. In one or more embodiments, locating features may include an asymmetric exterior shape or geometry matching an associated opening in housing 200 for proper alignment. Additional locating features may include flanges or rails 710, 712, and 714 that engage corresponding slots or similar features in housing 200. Optical alignment of lamp 610 may be provided by an associated locating surface or feature 720 that engages a corresponding surface on the back of a light source reflector secured within housing 200 and having an opening adapted to receive lamp 610.

Figure 8:
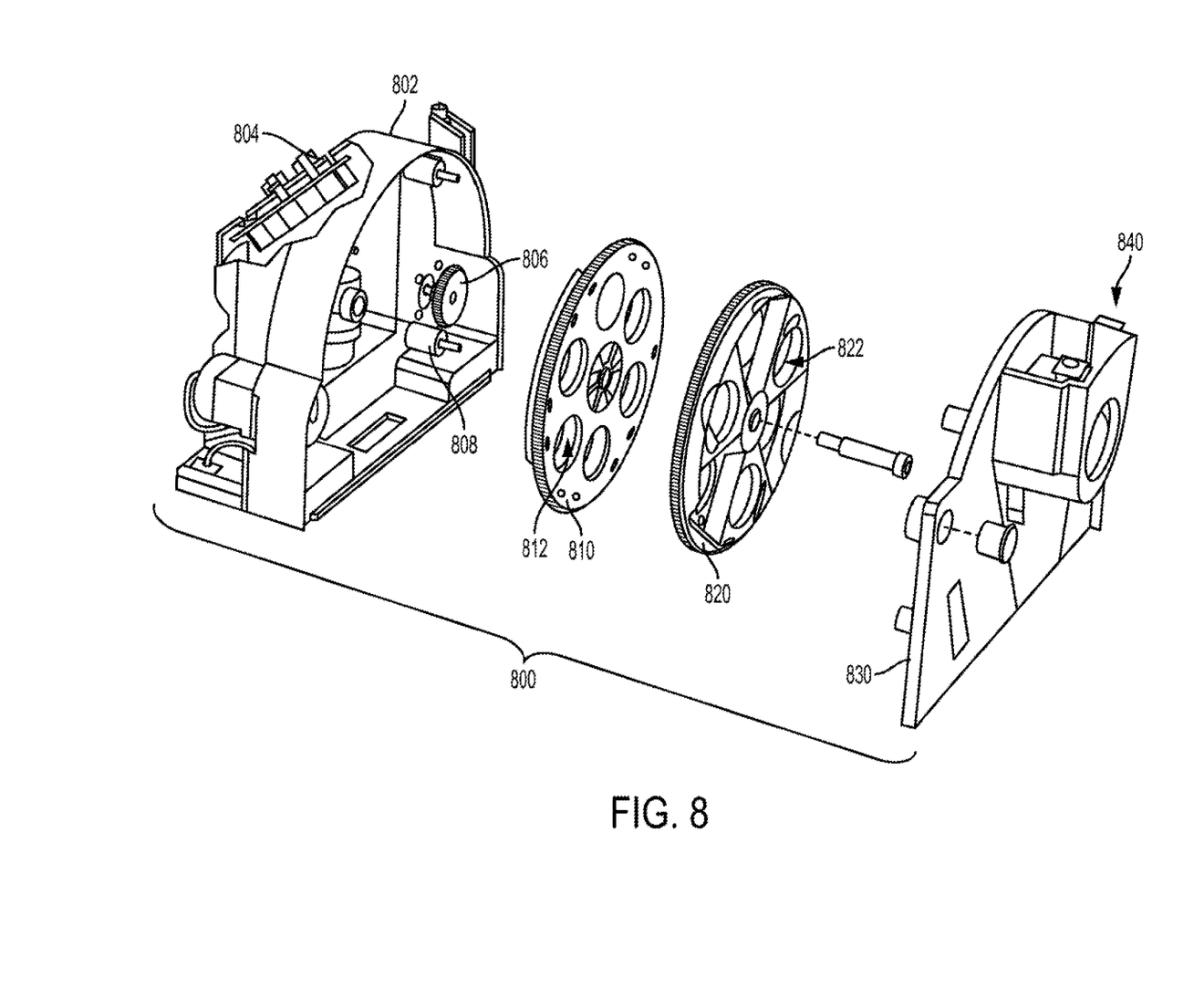
FIG. 8 illustrates a representative upper optics assembly of an optical instrument according to representative embodiments of the present disclosure.

FIG. 8 illustrates a representative upper optics assembly for an optical instrument according to representative embodiments of the present disclosure. In one or more embodiments, optical assembly 800 or a similar device may be used as a positioning mechanism to position a selected optical component in the optical path of the light beam. For example, optical assembly 800 may be used as a positioning device to position a selected entrance slit, a selected aperture, a selected polarizer, a selected filter, a selected lens, etc. in the optical path of the light beam based on signals provided to associated actuators from one or more associated controllers to control instrument 100.

In various embodiments, assembly 800 includes a housing 802 that may be configured to be secured to a top surface 104 of plate 102 or a bottom surface 106 of plate 102 as illustrated in FIG. 1. Housing 802 may indirectly secure a mirror 804 to plate 102, and may include one or more adjustment set screws for optical alignment of mirror 804. Housing 802 may include one or more actuators that include one or more gears 806 cooperating with a stepper motor 808 to selectively rotate a wheel 810 or otherwise move a similar device to position one of a plurality of optical components mounted in wheel 810 as generally represented at 812 in the optical path of the optical beam. Housing 802 may accommodate more than one wheel and actuator as generally represented by second wheel 820 having a plurality of optical components 822. A cover or end plate 830 may be secured to housing 802. End plate 830 may be configured to receive one or more fixed or adjustable optical elements 840. In one or more embodiments, end plate 830 includes support 840 for an adjustable focus lens assembly.

Assembly 800 may vary based on the particular application within instrument 100 and may include a single wheel 810, a dual wheel configuration as represented by wheel 820, or multiple wheels. Similarly, assembly 800 or similar positioning mechanism may be used to select one of a plurality of entrance slits for monochromator 116, one of a plurality of entrance slits for spectrometer 186, one of a plurality of polarizers or filters 136, or to selectively position an aperture into, or out of, the optical path as upstream of spectrometer 186 and downstream of sample 148 as previously described with reference to FIG. 1.

As those of ordinary skill in the art will appreciate, one or more of the previously described and illustrated embodiments may provide associated advantages including a compact instrument having a three-dimensional folded optical design for fluorescence and absorbance measurements that makes efficient use of benchtop space at a competitive cost. Use of a modular light source module provides a pre-installed and pre-aligned light source that may be user-installed in the instrument without tools, eliminating a technician service call for replacement and alignment. A modular sample tray facilitates various types of single or multiple cuvettes with an integrated microcontroller for self-identification, power for motor controlled turrets, and signal transmission of digital or analog signals from integrated meters, such as temperature probes and pH meters, for example. The housing and optical reference plate of one or more embodiments incorporate a highly integrated molded design with molded optical control points to facilitate optical alignment with minimal adjustments during production and quality control. In addition, use of injection molded engineered polymers having an expansion coefficient matching the base plate reduces or eliminates optical distortions associated with changes in ambient temperature.

While representative embodiments are described above, it is not intended that these embodiments describe all possible forms of a system or method for surface characterization of porous solids and powder materials according to the present disclosure. The words used in the specification are words of description rather than limitation, and it is understood that various changes may be made without departing from the spirit and scope of the disclosure. As previously described, the features of various representative embodiments may be combined in ways that are not explicitly illustrated or described to form further embodiments. While various embodiments may have been described as providing advantages or being preferred over other embodiments or prior art implementations with respect to one or more desired characteristics, as one of ordinary skill in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, operation, etc. Any embodiments described herein as less desirable than other embodiments or prior art implementations with respect to one or more characteristics are not outside the scope of the disclosure and may be desirable for particular applications.

What is claimed is:

1. An optical instrument, comprising:
   a housing;
   a plate disposed within the housing and configured to secure optical components to either a top surface or a bottom surface of the plate;
   a light source;
   a detector;
   at least one mirror secured to the plate and configured to direct light passing through at least one opening in the plate from the light source to a sample, and to direct light from the sample through the at least one opening in the plate to the detector;
   a monochromator; and a controller configured to communicate with the light source and the detector, wherein the at least one mirror comprises:
   a first mirror secured to the bottom surface of the plate and configured to direct light from the light source to an input of the monochromator; and
   a second mirror secured to the bottom surface of the plate and configured to direct light from an output of the monochromator through the at least one opening in the plate to one of the at least one mirror, the at least one mirror secured to the top surface of the plate.

2. The optical instrument of claim 1 further comprising a lens secured to the bottom surface of the plate in an optical path between the light source and the first mirror.

3. The optical instrument of claim 1 wherein the light source is disposed below the plate.

4. The optical instrument of claim 1 further comprising a sample holder configured to hold the sample and removably secured to the top surface of the plate.

5. The optical instrument of claim 1, wherein the housing comprises an access panel, and wherein the light source comprises a module having a lamp secured to the module and connected to an electrical connector of the module, the module configured to engage a complementary electrical connector in the housing upon insertion of the module into the housing, the module configured to be removable from the optical instrument through the access panel and secured in the housing by an associated latch.

6. The optical instrument of claim 1 further comprising an absorbance detector in communication with the controller and secured to the top surface of the plate, the absorbance detector positioned in an optical path of light from the light source that passes through the sample.

7. The optical instrument of claim 1 further comprising a reference detector in communication with the controller and secured to the top surface of the plate, the reference detector positioned to receive a portion of light from the light source and provide a corresponding signal to the controller.

8. The optical instrument of claim 1 further comprising:
an aperture positioning mechanism disposed above the top surface of the plate and in communication with the controller, the aperture positioning mechanism configured to selectively position an aperture into, or out of, an optical path between the sample and the detector in response to a positioning signal from the controller, wherein the detector comprises a spectrometer.

9. The optical instrument of claim 8 further comprising a slit plate positioning mechanism in communication with the controller, the slit plate positioning mechanism having a slit plate comprising a plurality of entrance slits having different widths and a common height, the slit plate positioned in the optical path between the sample and the spectrometer, the slit plate positioning mechanism configured to position one of the plurality of entrance slits in the optical path in response to a signal from the controller.

10. The optical instrument of claim 1 wherein the light source includes a spectrometer comprising:
a fixed concave diffraction grating positioned to receive an input light beam after passing through the sample, and to diffract the input light beam at a wavelength-dependent angle; and
a detector positioned to receive light diffracted from the fixed concave diffraction grating and configured to provide signals to the controller in response to the light received from the fixed concave diffraction grating.

11. The optical instrument of claim 1 wherein the housing includes a hinged sample access door selectively openable to access a sample chamber having a bottom defined by the top surface of the plate, the optical instrument further comprising:
a sample tray module configured for insertion into the sample chamber and to position the sample in an optical path between the light source and the detector, the sample tray module having a microcontroller configured to identify the sample tray module and coupled to an associated electrical connector, the associated electrical connector configured to engage a complementary electrical connector connected to the controller and disposed within the sample chamber upon insertion of the sample tray module in the sample chamber.

12. The optical instrument of claim 1 wherein the light source comprises a spectrometer including a fixed concave grating, the spectrometer having a focal length of less than 100 mm.

13. An optical instrument comprising:
a housing having a plate configured as an optical reference plane for one or more optical components of the optical instrument and configured to secure optical components above or below the plate;
a light source disposed in the housing below the plate;
a monochromator disposed below the plate and secured to the plate;
a spectrometer having a fixed concave grating, the spectrometer disposed below the plate and secured to the plate;
one or more mirrors disposed above the plate, secured to the plate, and configured to direct light from the monochromator passing through a first opening in the plate through a sample disposed above the plate, and to direct light from the sample through a second opening in the plate to the spectrometer; and
a controller configured for communication with the monochromator and the spectrometer.

14. The optical instrument of claim 13 further comprising:
an aperture configured for selective positioning either into, or out of, an optical path between the sample and the spectrometer by an actuator in communication with the controller.

15. The optical instrument of claim 14 wherein the aperture is disposed above the plate.

16. The optical instrument of claim 13 further comprising:
a sample tray module configured for insertion into a sample chamber of the housing above the plate to position the sample in an optical path between the monochromator and the spectrometer, the sample tray module having a microcontroller configured to identify the sample tray module and coupled to an electrical connector, the electrical connector configured to engage a complementary electrical connector in the housing within the sample chamber and connected to the controller.

17. The optical instrument of claim 13 wherein the light source comprises:
a module having a lamp secured to the module and connected to an electrical connector of the module, the module configured to engage a complementary electrical connector in the housing upon insertion of the module into the housing, the module configured to be removable from the optical instrument through an access panel of the housing, and secured in the housing without fasteners by an associated latch.

18. The optical instrument of claim 13 further comprising:
an absorbance detector disposed above the plate and secured to the plate, the absorbance detector configured to communicate with the controller and disposed in an optical path of light from the monochromator after passing through the sample; and
a reference detector disposed above the plate and secured to the plate, the reference detector configured to communicate with the controller and configured to receive a portion of light from the monochromator.

19. The optical instrument of claim 13 further comprising:
an actuator associated with a slit plate having a plurality of entrance slits each having a different width and a predetermined height, the actuator disposed below the plate and configured to communicate with the controller to position one of the plurality of entrance slits in an optical path of an input beam to the spectrometer.

20. An optical instrument comprising:
a plate having a first surface and a second surface opposite the first surface;
a first optical component secured to either the first surface or the second surface of the plate;
a second optical component secured to an opposite one of the first and second surfaces of the plate relative to the first optical component, wherein the second optical component comprises at least one of a light source, a detector, a monochromator, and a spectrometer;

at least one mirror secured to the same surface of the plate as the second optical component and configured to direct light from the second optical component through a first opening in the plate; and at least one mirror secured to the same surface of the plate as the first optical component and configured to direct light from the first opening in the plate to the first optical component, and to direct light from the first optical component through a second opening in the plate.

* * * * *